United States Patent [19]

Staerzl

[11] 4,305,351
[45] Dec. 15, 1981

[54] TWO-CYCLE ENGINE WITH FUEL INJECTION

[75] Inventor: Richard E. Staerzl, Fond du Lac, Wis.

[73] Assignee: Brunswick Corporation, Skokie, Ill.

[21] Appl. No.: 120,467

[22] Filed: Feb. 11, 1980

[51] Int. Cl.³ .................... F02B 33/04; F02B 33/07
[52] U.S. Cl. .................... 123/73 A; 123/55 VS; 123/59 B; 123/73 R
[58] Field of Search ............ 123/73 A, 73 R, 55 VS, 123/59 B, 441, 462, 463, 464, 478

[56] References Cited

U.S. PATENT DOCUMENTS

| | | | |
|---|---|---|---|
| 1,372,955 | 3/1921 | Keenan | 123/73 A |
| 1,999,520 | 4/1935 | Stout | 123/73 A |
| 2,428,199 | 9/1947 | Buske | 123/59 B |
| 3,015,325 | 1/1962 | Williams et al. | 123/73 A |
| 3,166,054 | 1/1965 | Conovor | 123/55 VS |
| 3,280,805 | 10/1966 | Müller | 123/55 VS |
| 3,425,403 | 2/1969 | May | 123/73 A |
| 3,698,368 | 10/1972 | Yamamoto | 123/73 R |
| 3,810,450 | 5/1974 | Woodhouse | 123/73 A |
| 3,881,454 | 5/1975 | Jaulmes | 123/73 R |
| 4,227,492 | 10/1980 | Haase | 123/59 B |
| 4,244,332 | 1/1981 | Kusche et al. | 123/59 B |

Primary Examiner—Raymond A. Nelli
Attorney, Agent, or Firm—Hopgood, Calimafde, Kalil, Blaustein & Judlowe

[57] ABSTRACT

The invention contemplates electronically controlled fuel-injection for a multiple-cylinder two-cycle internal-combustion engine wherein each cylinder has its own independent crankcase region in which to receive and compress inlet air and fuel, prior to delivery of combustible mixture to the head or combustion end of the cylinder. Fuel is injected into each crankcase region during only a portion of the stroke involving induced intake of air therein, i.e., during only a portion of the rise of each piston in its approach to top-center position, and while pressure within the crankcase region is relatively uniform. The time-duration of actual injection is relatively short, thus enabling a plurality of different cylinder injections to be made concurrently, resulting in simplification of fuel-injection control circuitry.

19 Claims, 13 Drawing Figures

TWO-CYCLE ENGINE WITH FUEL INJECTION

BACKGROUND OF THE INVENTION

The invention relates to the problem of fuel injection in a multiple-cylinder two-cycle engine, and in particular to the economic and reliable electronic control of such injection, particularly for engines having four or more cylinders.

To provide fuel injection in a two-cycle engine of the character indicated, it has been proposed to employ for each cylinder a solenoid-operated injector valve adjacent an injection nozzle, and to make the injection in the intake or plenum passage supplying inlet air and fuel via the check-valve vanes (or reed bank) which retain air and fuel admitted to the crankcase region of the particular cylinder. But this approach imposes severe timing and precision limitations on the injection portion of the cycle; for example, the injection period must be short, to assure that all or substantially all injected fuel can be admitted to the crankcase before the flow rate of induction into the crankcase approaches zero. The penalty for failure to admit all fuel to the crankcase is, in the case of an outboard motor wherein cylinders are in vertically stacked array, to allow unduly enriched fuel-air mixtures in the lower cylinders, meaning inefficiency and failure to achieve design engine output, through an inability to deliver the same fuel-air ratio to all cylinders. Such limitations apply regardless of the sophistication that may be built into individual electronic timing circuits serving the individual fuel injectors.

BRIEF STATEMENT OF THE INVENTION

It is an object of the invention to provide an improved fuel-injection two-cycle engine of the character indicated.

Another object is to provide an improved system of fuel-injection in such an engine whereby each of the multiple cylinders receives its aliquot share of the fuel flow, for any given engine-load or speed condition.

A further object is to provide such an engine wherein the time available for fuel injection may be an enlarged fraction of the operating cycle within each cylinder.

It is also an object to provide substantially more simple electronic means for controlling such fuel injection.

A general object is to achieve the above objects with structure of inherent simplicity, low cost, reliability, and flexible adaptation to a wide range of operating conditions.

The foregoing and other objects and features of the invention are realized in multiple-cylinder two-cycle engines wherein fuel-injection is made directly into the crankcase region of each cylinder and within the time interval of relatively constant pressure which exists prior to the compression phase of the crankcase region. Economy of structure and reliability of operation result from using the ignition function of one cylinder to initiate the control function for injectors in multiple other cylinders, and a single function generator responds to various operating-parameter conditions, to control the uniform timing of the injection function, as the same is caused to apply for each cylinder.

The invention is most particularly described for the case of a six-cylinder engine, but illustrative further consideration is given for four-cylinder, five-cylinder and eight-cylinder engines.

DETAILED DESCRIPTION

The invention will be described in detail for various embodiments in conjunction with the accompanying drawings, in which.

Figure 5:
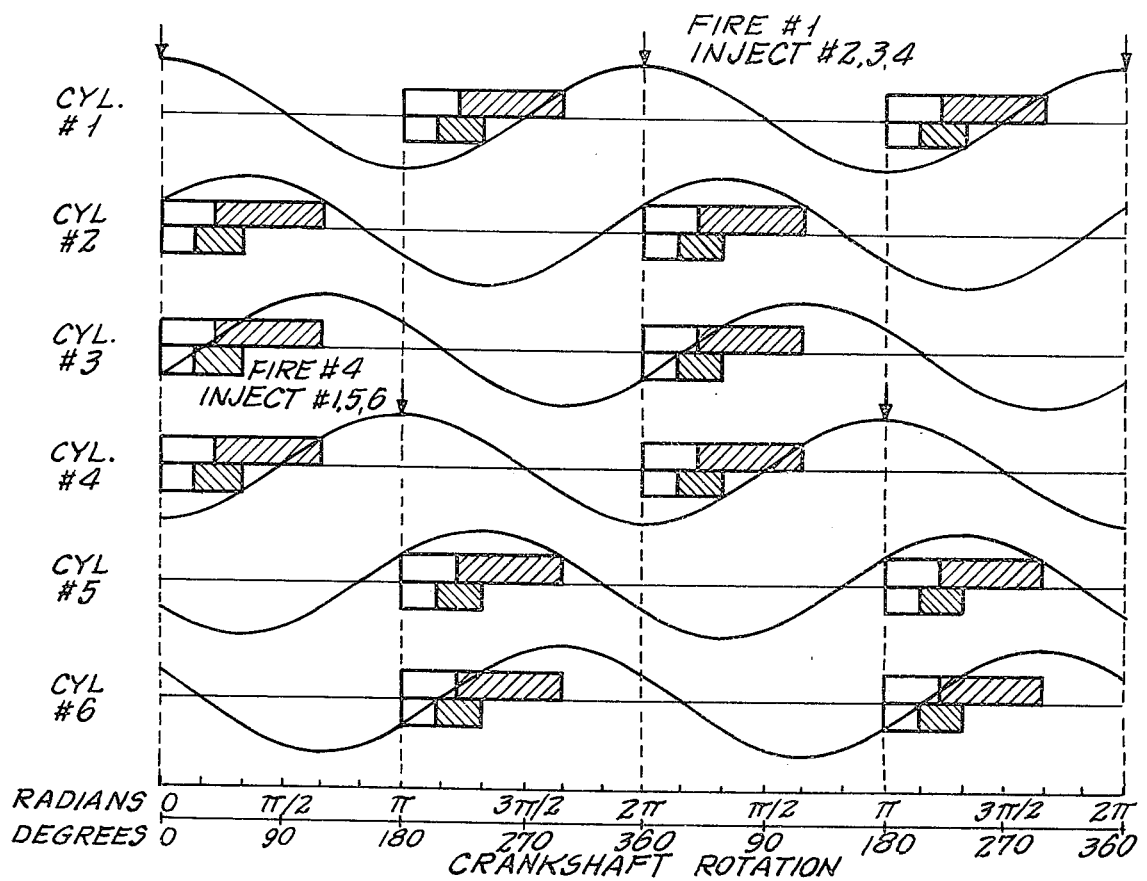
FIG. 5 is a graphical display of piston position as a function of crank angle, covering two full cycles of operation, for each of the six cylinders of the engine of FIGS. 1 and 2, with additional plots of fuel-injection timing, as applicable to the respective cylinders.
Figure 11:
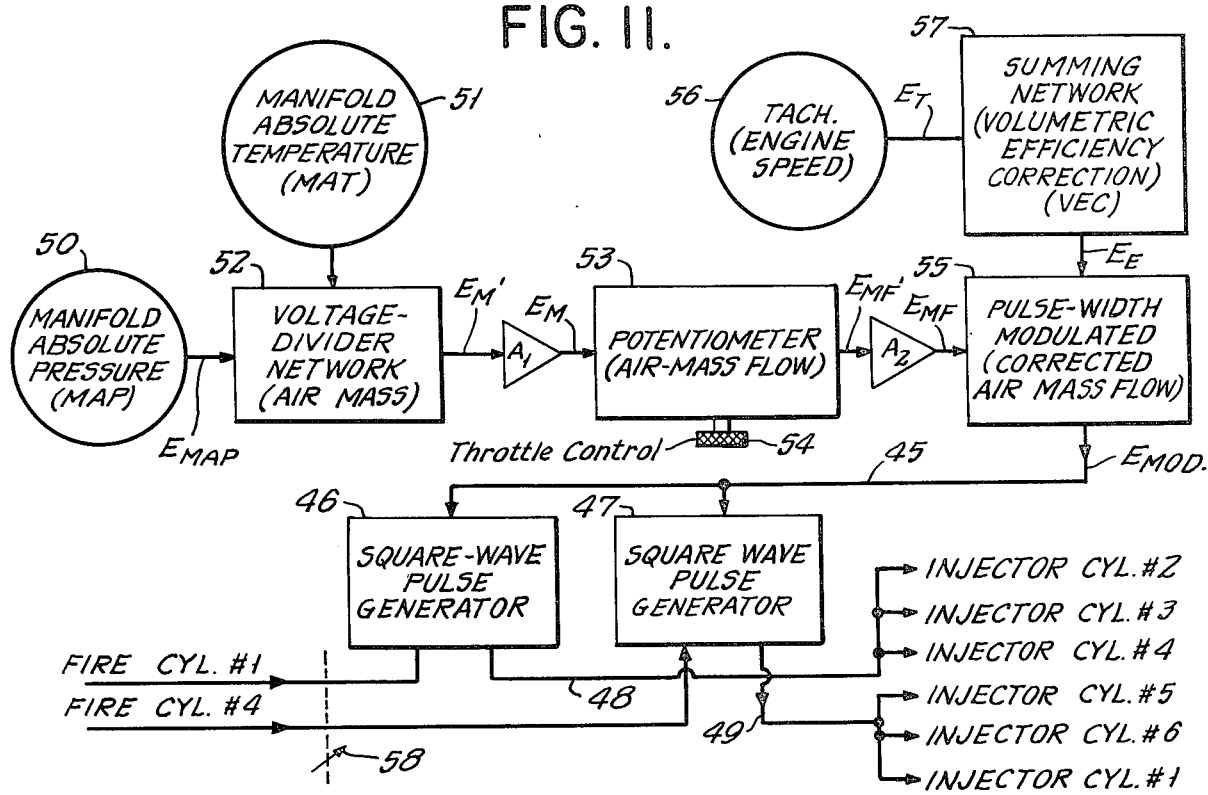
Figure 11A:
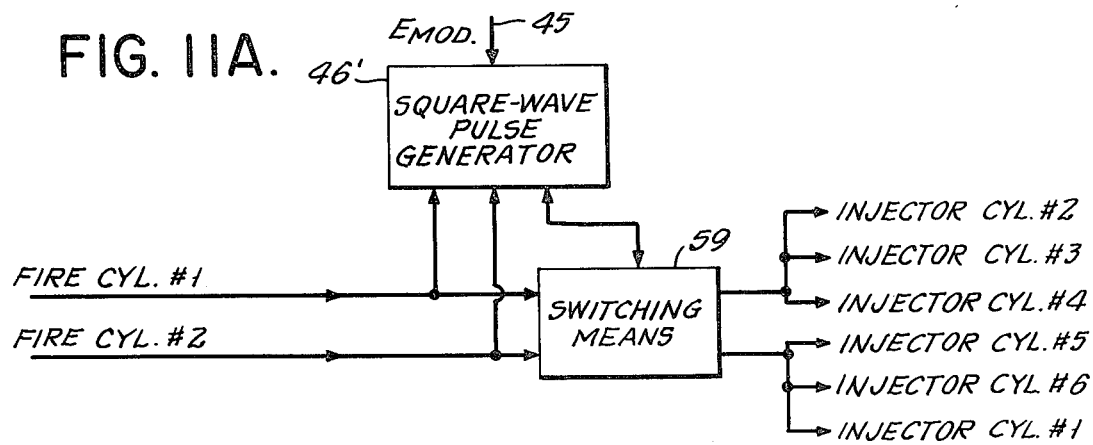
Figure 12:
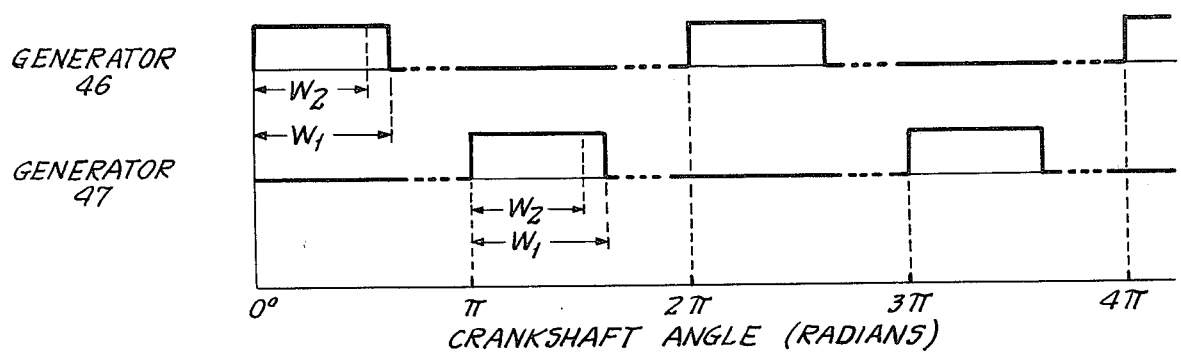

FIGS. 6, 7, 8, 9, and 10 are graphical displays similar to FIG. 5, for different engine and fuel-injection configurations embodying the invention;

FIG. 11 is an electrical block diagram; schematically indicating components of fuel-injection control circuitry, applicable to various embodiments of the invention;

FIG. 11A is a fragmentary diagram to illustrate modification of a part of FIG. 11; and FIG. 12 is a graphical presentation to illustrate various functions of time, involved in operation of the FIG. 11 circuitry.

Figure 2:
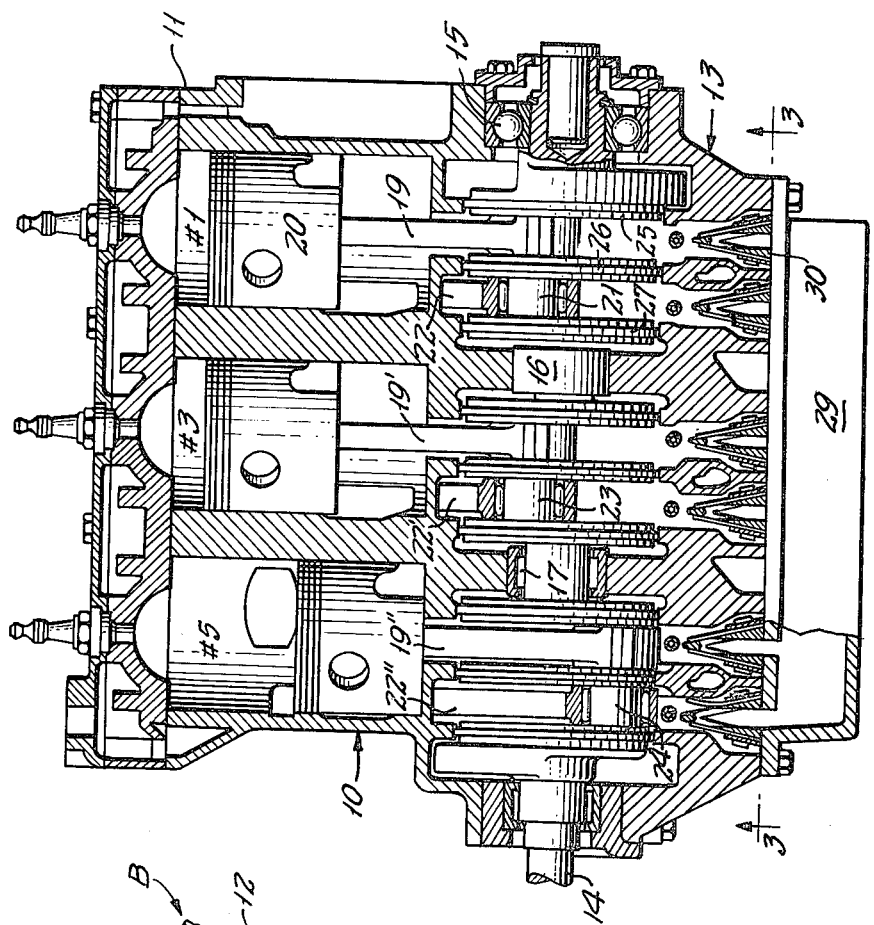
FIG. 2 is a longitudinal sectional view, taken at 2—2, through one of the cylinder banks of the engine of FIG. 1.
Figure 1:
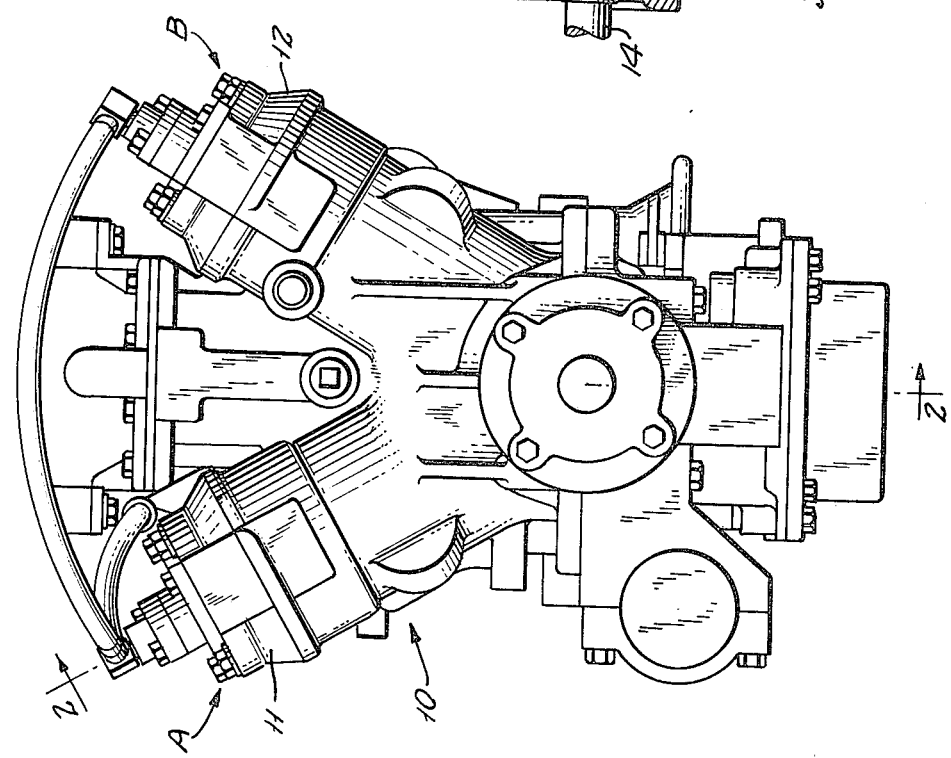
FIG. 1 is an end-elevation view of a V-6 two-cycle outboard engine incorporating the invention.
Figure 3:
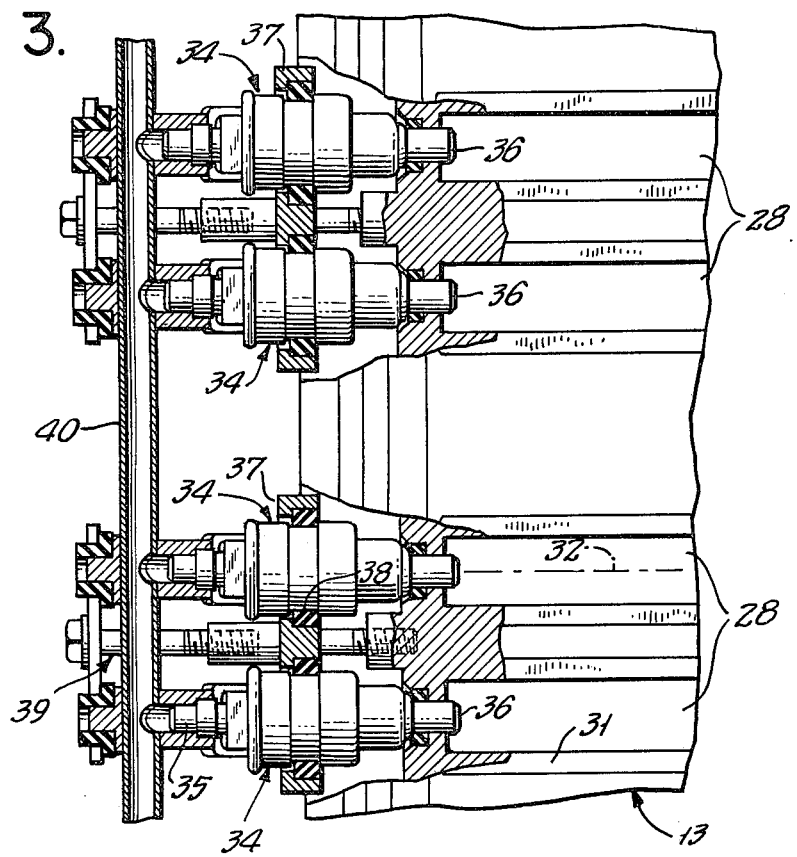
FIG. 3 is a fragmentary view, in partial section, at the plane 3—3 of FIG. 2.

Referring initially to FIGS. 1, 2 and 3, the invention is shown in application to a two-cycle V-6 engine having two banks A–B of three cylinders at 60-degrees angular separation, the sectional view of FIG. 2 being taken through the A bank, comprising cylinders #1, #3 and #5. All cylinders are formed in a single block 10, with cylinder heads 11-12 (and spark plugs) closing cylinders of the respective banks, and with fuel-air supply block 13 secured to the bottom of the engine block, at the plane of the axis of a crankshaft 14. A ball bearing 15 provides axially located rotary support for one end of crankshaft 14, and additional anti-friction support is provided, at two-cylinder intervals, by needle bearings 16-17-18. The cylinders of the respective banks A–B are in spaced radial planes (i.e., staggered interlace) along the crankshaft axis, so that the connecting rod 19 for the piston 20 of cylinder #1 (band A) may have longitudinally adjacent connection to the same crankshaft throw 21 as does the connecting rod 22 for cylinder #2 (not shown) of bank B, being the next-adjacent cylinder. Succeeding pairs of connecting rods, such as rods 19'-22' for adjacent cylinders #3 and #4, are similarly connected to a second crankshaft throw 23; and rods 19"-22" for adjacent cylinders #5 and #6 are connected to a third crankshaft throw 24, it being understood that the throws 21-23-24 are at successive 120-degree offsets about the crankshaft axis.

For isolation of a crankcase region unique to the piston of each cylinder, and to its crankshaft connection, seal discs, such as the discs 25-26 on opposite sides of rod 19 and discs 26-27 on opposite sides of rod 22, are carried for rotation with the crankshaft and have peripheral sealing action with opposed arcuate contours of crankcase-wall formations in the respective engine blocks 10-13. And separate inlet passages 28 (see FIG.

3) to the respective crankcase regions are served by a single plenum 29, for manifolded supply of inlet air. A system of check valves, in the form of a reed-bank unique to each inlet passage 28, such as the reed-bank 30 at the cylinder #1 location, serves the crankcase region of each cylinder location, thereby assuring automatic closure of each crankcase region when its intake function ends. Such reed-banks are well-understood and therefore require no elaborate description. It suffices to explain that a reed-bank as at 30 comprises an elongate internally open prismatic frame of generally isoceles-triangular section, with base glanges to locate in seating-recess formations 31 (see FIG. 3) adjacent the sidewalls of each passage 28, at the plenum-connection end. The downstream end of each reed-bank 30 is essentially a line extending centrally of the long dimension of the generally rectangular cross-section of each passage 28, such line being suggested by a phantom line 32 for one of the passages 28 in FIG. 3; and check-valve action is via plural stiffly compliant reed members, clamped at one end near the base of the respective sloping sides of the triangular section, with openable coverage of discharge ports near the downstream ends of said sloping sides.

In accordance with a feature of the invention, fuel-injection is made unique to each crankcase region and at a location just downstream from the downstream end of each reed-bank 30. For this purpose, a separate solenoid-operated injector assembly 34 is mounted to one side of the intake block, for each crankcase region; such injector assemblies 34 are commercially available and therefore need not be described in detail. If suffices to state that each injector assembly 34 has a fuel-inlet end 35 and an injection nozzle 36 at its opposite end, the discharge axis of nozzle 36 being aligned preferably parallel to and slightly downstream from the downstream-end alignment 32 of the associated reed-bank 30. As seen in FIG. 3, a flanged member 37 is the means of applying clamp pressure via an elastomeric ring 38 for the loading of each injector assembly 34 in sealed seated position for the described direction of injection discharge. The same system of clamp rods 39 which loads member 37 into injector-retaining position also and analogously clamps the fuel-supply line 40 in common to the inlet end 35 of all injector assemblies 34, and it will be understood that fuel-pump means (not shown, but illustratively electric-motor driven) may assure at all times an elevated-pressure condition of fuel at the respective inlets 35; the elevated pressure should be well above any possible crankcase pressure (i.e., well above atmospheric pressure), and may suitably be in the range 30 to 50 psi, the same being regulated in such manner as to maintain a substantially constant differential pressure across the injectors. Also, the discharge-flow capacity of each injector assembly 34 should be such that even the circumstance of three injectors 34 simultaneously discharging will not materially reduce the fuel-supply pressure in line 40.

Figure 4:
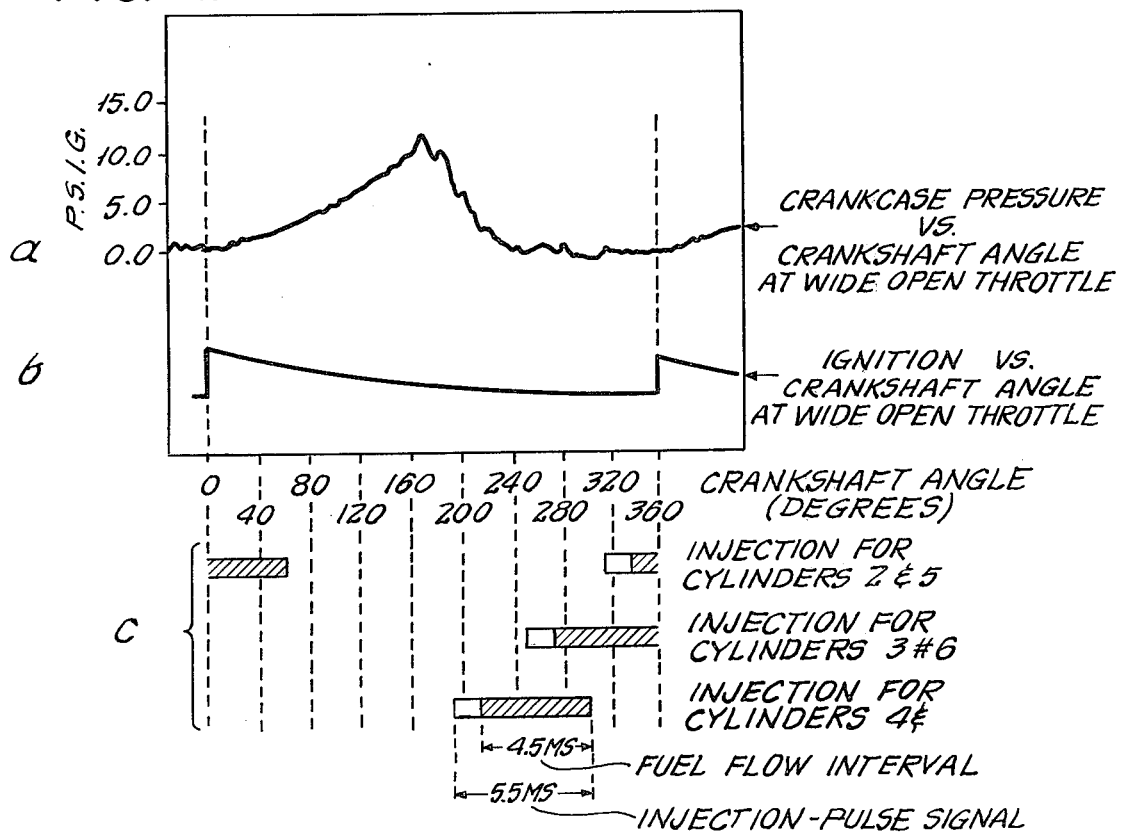
FIG. 4 is a graphical display of crankcase pressure as a function of crank angle for one of the cylinders of the engine of FIGS. 1 and 2, certain functions of the invention being also plotted to the same crank-angle function.

FIG. 4 is a graphical display to enable an understanding of the ignition function and the crankcase-pressure condition, as the same are typically related to crankshaft angle, for the case of any one of the cylinders of the described engine. Such an understanding is needed to appreciate another feature of the invention, having to do with fuel-injection economy and reliability. For consistency in referring all cylinder cycles to the same crankshaft cycle, the pressure and ignition curves of FIG. 4 will be stated to apply for cylinder #1.

For convenience in FIG. 4, ignition time for the displayed cylinder is taken as the origin for the 360-degree cycle of bottom-cylinder (i.e., crankcase, curve a) and top-cylinder (curve b) conditions, it being clear from the curve of crankcase pressure that pressure conditions are at their lowest, i.e., near atmospheric pressure (0 psig) over a substantial angular spread, from about the 200-degree crankshaft position (for the particular cylinder's piston), past the ignition position, and until about 60 degrees into the ensuing cycle. This represents a relatively generous fraction (namely, 220 degrees) of the total cycle, within which friction crankcase pressure is close to atmospheric pressure and very definitely less than a 5 psi pressure differential. Thus, over this 220-degree fraction of crankshaft rotation, the pressure-differential which determines quantity of injected-fuel for a given injector-discharge interval will be fairly constant, the percent variation from constant being smaller the greater the fuel-supply pressure in line 40; e.g., for 50 psig supply pressure, the variation of this pressure difference is less than 10 percent. The crankcase pressure and the plenum pressure are substantially the same when the reeds are open.

The invention utilizes the above observation as to substantially uniform injection-pressure differential, by providing injector assemblies 34 which, for the particular engine size are able to discharge the maximum volume of injected fuel within approximately 90 degrees of crankshaft rotation, at full-throttle, in approach to full speed. For the case of an engine with a top speed of 5500 rpm, 90 degrees of crankshaft rotation occurs in 4.5 milliseconds (MS); therefore, assuming that approximately one millisecond is required in which the injector solenoid overcomes armature and valve-member inertia, and in which fuel-discharge flow can build from zero to maximum, the maximum length of solenoid-energizing pulse needed by the engine will be 5.5 MS, corresponding to 110 degrees of crankshaft rotation at full speed.

With injector assemblies of the foregoing nature and capability, the invention contemplates economy of apparatus, by utilizing one set of injection-pulse signals (i.e., one square-wave pulse per crankshaft cycle) as the basic fuel-injection control for a first plurality of cylinders, and another set of injection-pulse signals as the basic fuel-injection control for a second plurality of cylinders. Thus, it is assured that the fuel-flow demands per crankshaft cycle will be two, with no overlap and with substantial dwell therebetween.

In the six-cylinder engine thus far described, and as more particularly depicted in FIG. 5, the first injection-pulse signals govern three injectors in unison, and are timed by the ignition signal for one cylinder; and the other injection-pulse signals govern the three remaining injectors in unison, and are timed by the ignition signal for the cylinder which is 180 degrees away, i.e., phase-opposite to the cylinder having the first ignition signal. The bar diagrams at the curve c region of FIG. 4 show the timing of simultaneous injection pulses for cylinders #2, #3, and #4, each in relation to its own cycle of crankshaft rotation and for the case of pulse initiation by the ignition signal for cylinder #1; and if curves a and b of FIG. 4 are taken to apply for cylinder #4, then the bar diagrams of curve c similarly show the timing of injection pulses for cylinders #5, #6, and #1, as indicated by legend. In every case, the full 5.5 MS maximum bar length (injection-pulse duration) is displayed, involving an unshaded first millisecond within which above-noted inertial effects take place prior to the shaded region of full injected-fuel flow. At slower speeds, less fuel is needed and, therefore, the bar lengths will be shorter, in relation to crankshaft angle.

The foregoing discussion will become more clear by reference to FIG. 5, in which sinusoidal piston displacement is depicted at separate curves A, B, C . . . F for each of the respective six cylinders. Ignition in cylinder #1, i.e., at the top-cylinder position for piston 20 in cylinder #1, is seen to determine the simultaneous injection of fuel into the respective crankcase regions of cylinders #2, #3, and #4; and, in 180-degree phase-interlace, i.e., at the top-cylinder instant of firing cylinder #4, simultaneous and like fuel-injection is made into the respective crankcase regions of cylinders #5, #6 and #1. In every case, an upper bar (first blank, then shaded) symbolizes a full-throttle condition, near full speed, while a lower bar (also first blank, then shaded) symbolizes a lesser-throttle or cruising condition. In all cases, fuel-injection is seen to occur well within the indicated substantially uniform low-pressure fraction of the operating cycle for the particular cylinder. In the case of cylinders #2 and #5, injection occurs while the associated piston is near its top-cylinder position, at which time curve a of FIG. 4 indicates substantially uniformly low crankcase pressure. In the case of cylinders #3 and #6, injection occurs while the associated piston is in approach to its top-cylinder position, i.e., in the latter half of the phase in which fresh air is being drawn into the associated crankcase region. And in the case of cylinders #4 and #1, injection occurs while the associated piston is in the early half of its rise to top-cylinder position, i.e., also in the air-induction phase.

Figure 6:
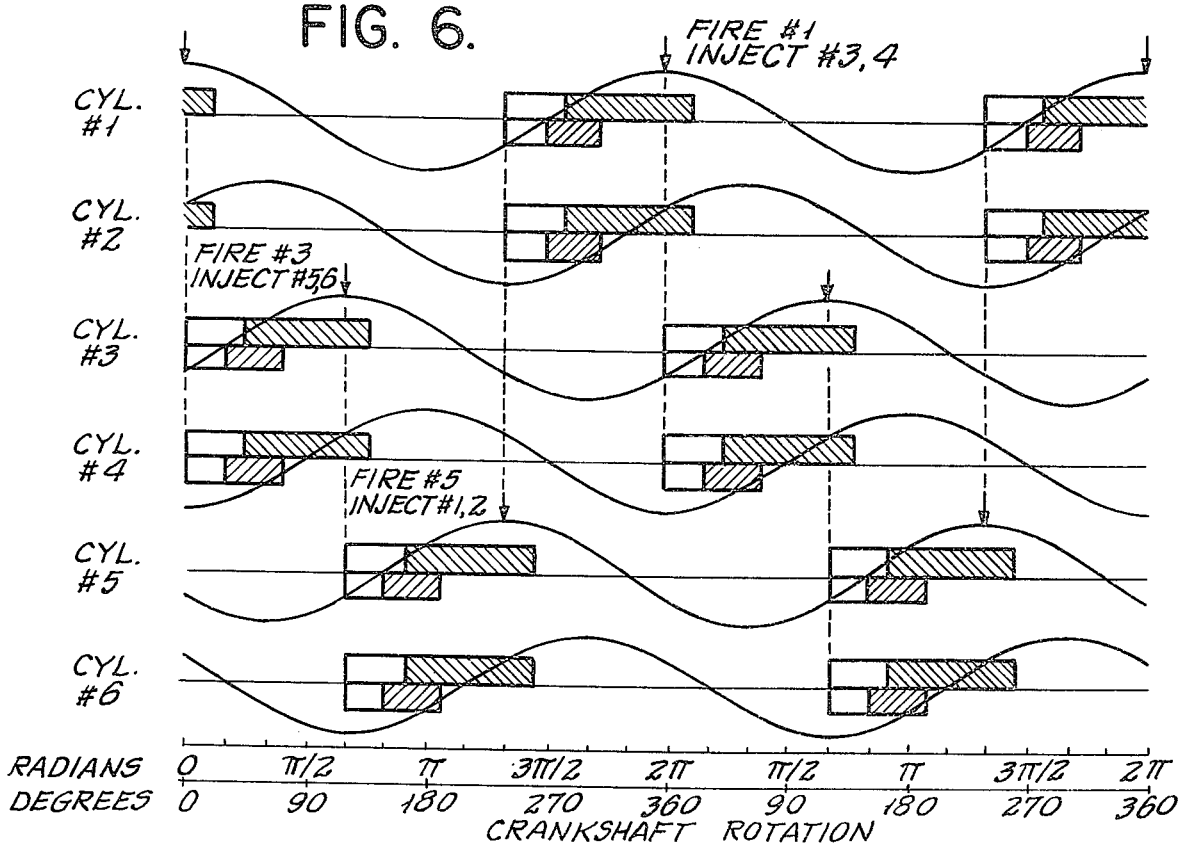

FIG. 6 represents another six-cylinder employment of the invention, wherein each of three firings, spaced 120 degrees, serves to control fuel-injection functions for two cylinders. Thus, the firing or ignition pulse for cylinder #1 times commencement of the injection-pulse signal for simultaneous operation of the fuel-injectors 34 of cylinders #3 and 4; the firing or ignition-pulse signal for cylinder #3 times commencement of the injection-pulse signal for cylinders #5 and #6; and the firing or ignition-pulse signal for cylinder #5 times commencement of the injection-pulse signal for cylinders #1 and #2. It will be seen that the FIG. 6 embodiment of the invention provides more degrees of crankshaft rotation within which to accomplish desired throttle variation, i.e., variation of injection-pulse duration; FIG. 6 thus enables an injector assembly 34 with given inertial and flow limitations to serve a higher-speed engine, at the expense of providing a third set of injection-pulse control signals.

Figure 7:
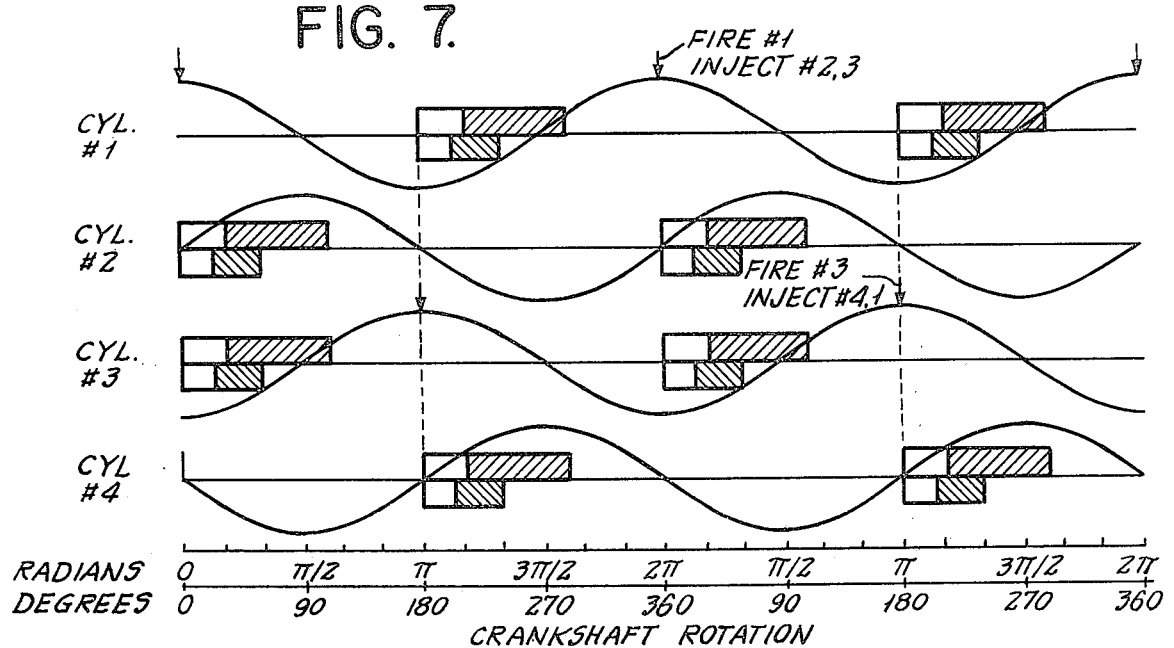

FIG. 7 will be recognized for its similarity to FIGS. 5 and 6, in specific application of the invention to a four-cylinder two-cycle engine, wherein the ignition or firing pulse for cylinder #1 determines commencement of the fuel-injection control pulse for simultaneous fuel-injection at the respective crankcase regions of cylinders #2 and #3, and wherein the firing pulse for cylinder #3 determines commencement of the fuel-injection control pulse for simultaneous fuel-injection at the crankcase regions of cylinders #4 and #1. Thus, for each crankshaft rotation, one firing pulse controls two fuel injections, and 180 degrees later, a second firing pulse controls the remaining two fuel injections.

Figure 8:
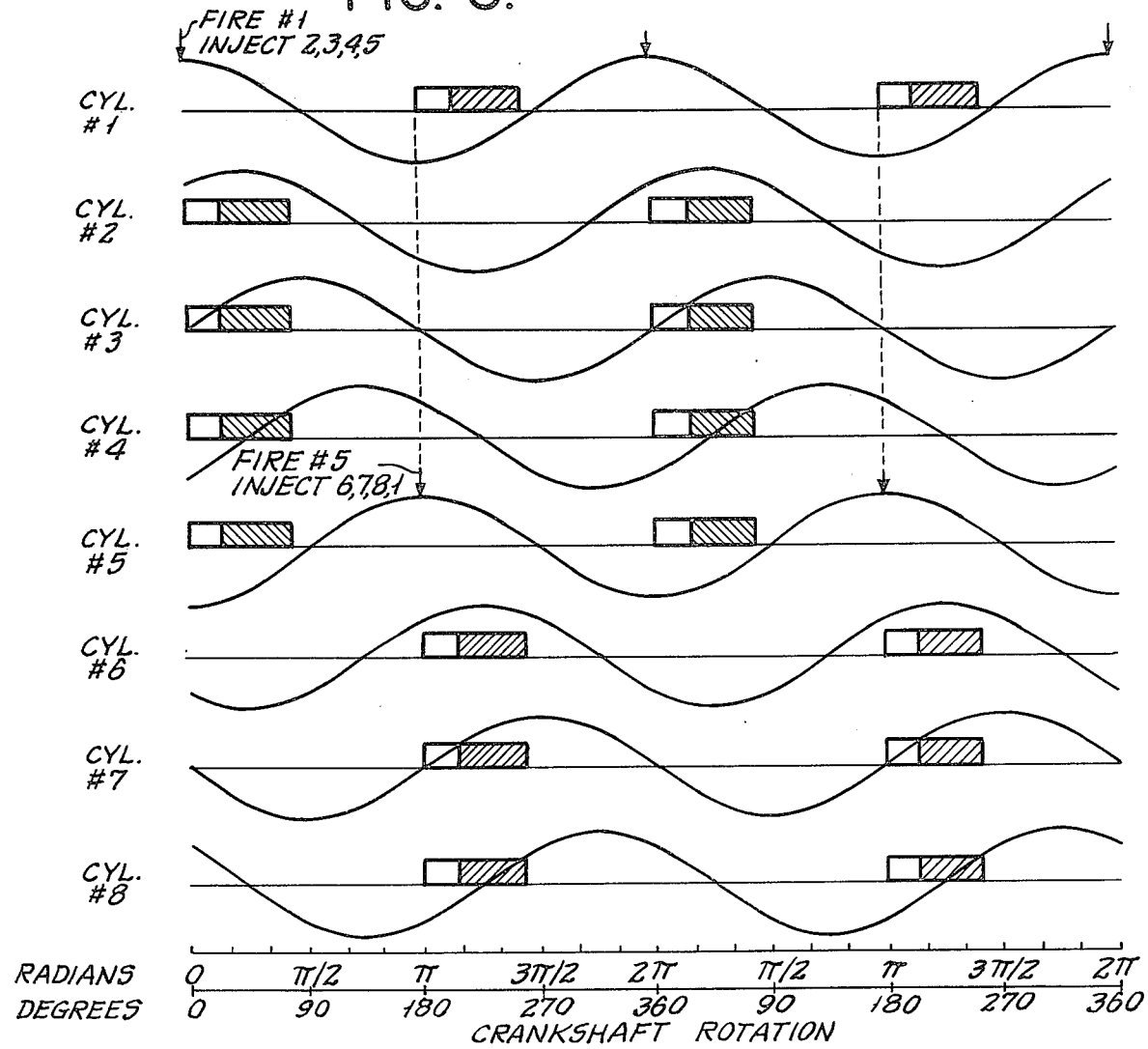

FIG. 8 illustrates that in an eight-cylinder two-cycle engine, a single ignition or firing pulse for cylinder #1 may correctly determine the simultaneous injection of fuel into four cylinders, viz. #2, #3, #4 and #5, while another single firing pulse for cylinder #5 (i.e., 180 degrees later) may similarly determine simultaneous injection of fuel into the remaining four cylinders, viz, #6, #7, #8 and #1. Principles remain for the 8-cylinder case, as for the four and six-cylinder cases.

Figure 9:
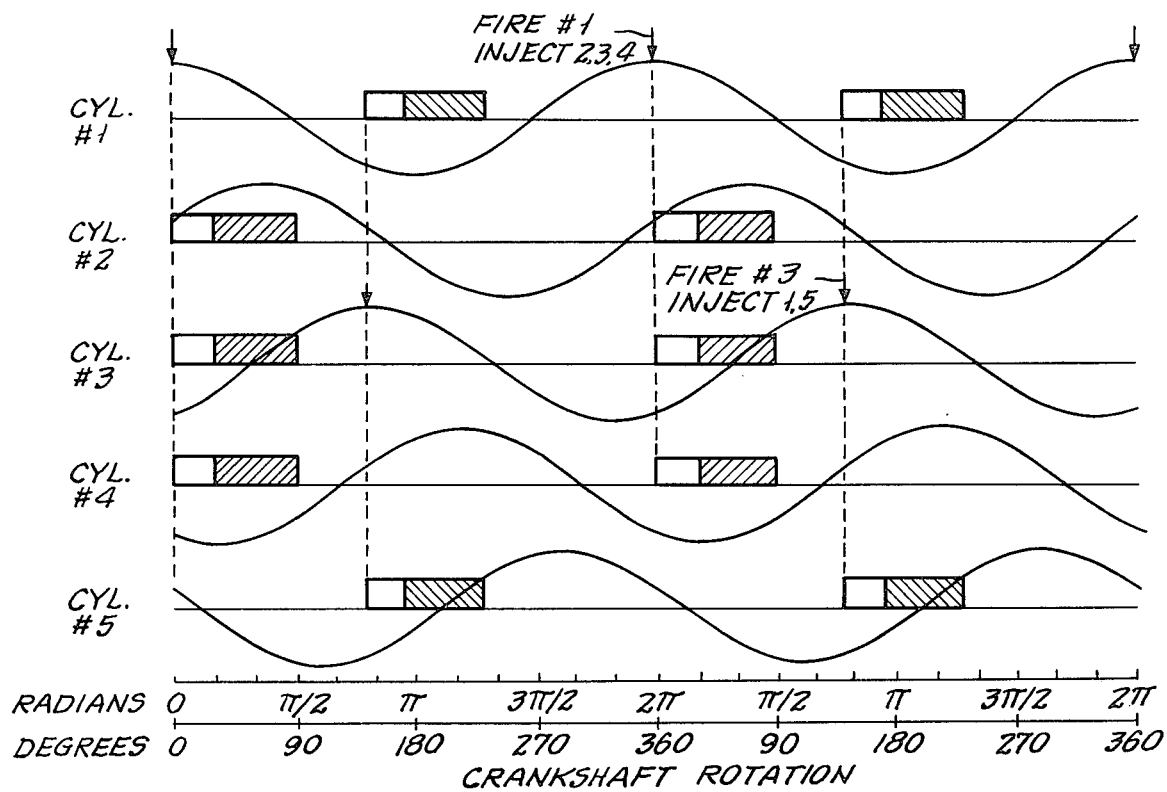
Figure 10:
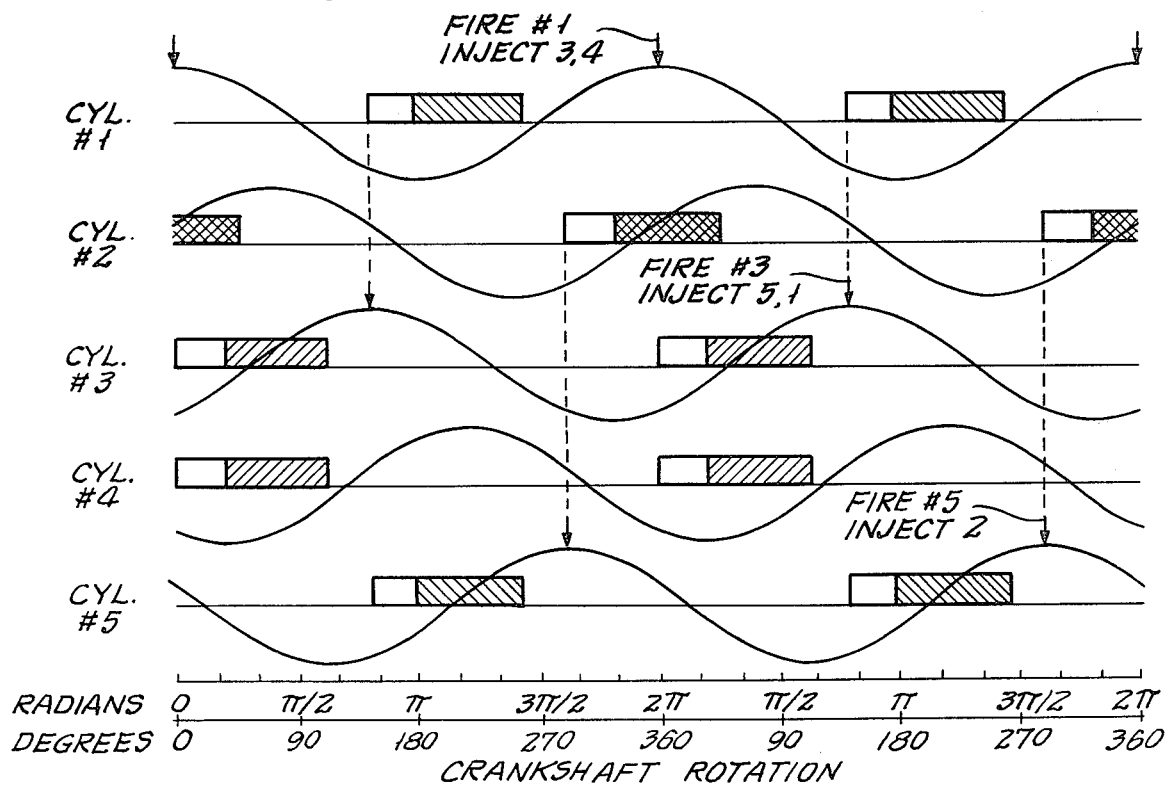

FIGS. 9 and 10 illustrate two different applications of the invention to engines of the five-cylinder two-cycle variety. In FIG. 9, the firing of cylinder #1 determines fuel-injection at cylinders #2, #3 and #4, while the firing of cylinder #3 determines fuel-injection at cylinders #5 and #1; thus, two separate sets of fuel-injection control pulses must be generated. In FIG. 10, the firing of cylinder #1 determines fuel-injection at cylinders #3 and #4, the firing of cylinder #3 determines fuel-injection at cylinders #5 and #1, and the firing of cylinder #5 determines fuel-injection at cylinder #2; thus, an additional or third set of fuel-injection control pulses must be generated. In all cases, however, the wide angle (of crankshaft degrees) associated with relatively uniform low pressure in each crankcase region permits wide latitude of throttle control, with economy of fuel-injection control-pulse generation.

Pulse-generator circuitry applicable in principle to above-described embodiments, and specific to the six-cylinder embodiment of FIG. 5, is schematically shown in FIG. 11. As shown, the circuit operates on various input parameters, in the form of analog voltages which reflect air-mass flow for the current engine speed, and a correction is made for volumetric efficiency of the particular engine, to arrive at a modulating-voltage output $E_{MOD}$ in a line 45 to each of two like square-wave pulse generators 46–47. When triggered by an input pulse associated with spark-plug firing in cylinder #1, generator 46 initiates the creation of an output pulse in line 48 to the injector solenoids of the means 34 associated with the three cylinders #2, #3 and #4; and when similarly triggered by an input pulse associated with spark-plug firing in cylinder #4, generator 47 initiates the creation of an identical output pulse in line 49 to the injector solenoids of the means 34 associated with the remaining three cylinders #5, #6 and #1. Depending upon the magnitude of the modulating voltage $E_{MOD}$ in line 45, the square-wave output at 48 will be of predetermined duration, and the square-wave output at 49 will always be of duration identical to that in line 48, it being understood that the predetermined duration is always a function of instantaneous engine-operating conditions.

More specifically, for the circuit shown, a first electrical sensor 50 of manifold absolute pressure (e.g., within plenum 29) is a source of a first voltage $E_{MAP}$ which is linearly related to such pressure, and a second electrical sensor 51 of manifold absolute temperature (also within plenum 29) may be a thermistor which is linearly related to such temperature, through a resistor network 52. The voltage $E_{MAP}$ is divided by the network 52 to produce an output voltage $E_M'$ which is a linear function of instantaneous air-mass or density within plenum 29, i.e., at inlet of air to the engine. A first amplifier $A_1$ provides a corresponding output voltage $E_M$ at the high-impedance level needed for regulation-free application to the relatively low impedance of a potentiometer 53, having a selectively variable control that is symbolized by a throttle knob 54. The voltage output $E_{MF}'$ of potentiometer 53, reflects a "throttle"-positioned pick-off voltage and thus reflects instantaneous air-mass flow, for the instantaneous throttle (54) setting, and a second amplifier $A_2$ provides a corresponding output voltage $E_{MF}$ for regulation-free application to one of the voltage-multiplier inputs of the pulse-width modulator 55, which is the source of $E_{MOD.}$ already referred to.

The other voltage-multiplier input of modulator 55 receives an input voltage $E_E$ which is a function of engine speed and volumetric efficiency. More specifically, a tachometer 56 generates a voltage $E_T$ which is linearly related to engine speed (e.g., speed of crankshaft 14, or repetition rate of one of the spark plugs), and a summing network 57 operates upon the voltage $E_T$ and certain other factors (which may be empirically determined, and which reflect volumetric efficiency of the particular engine size and design) to develop the voltage $E_E$ for the multiplier of modulator 55. The modulator 55 will further be understood to include provision for a fixed voltage bias to be added to the product of voltages $E_{MF}$ and $E_E$, whereby the modulating-voltage output $E_{MOD.}$ additionally reflects a fixed allowance for above-noted inertial characteristics of the initial phase of exciting the particular fuel-injector assembly 34 which has been adopted for the engine.

To summarize, the output of modulator 55 will be seen as a voltage $E_{MOD.}$ which can be linearly related (at 46, and at 47) to the time duration of pulses initiated by the respective firing-pulse inputs to generators 46 and 47. Such duration is thus caused by the circuit of FIG. 11 to track the instantaneous solution of the expression:

Pulse duration $= [MAP/MAT][(TP)(VEC)]k + T_I$, where:
MAT is manifold absolute pressure,
MAP is manifold absolute temperature,
TP is throttle position (i.e., setting of knob 54),
VEC is volumetric efficiency correction,
k is a constant, and
$T_I$ is the constant initiation time associated with the inertial character of the injector means 34.
More specifically, in terms of the voltages involved:

$E_{MOD.} = [k \cdot E_{MF}/(E_S - E_E)] + E_{TI}$, where:
$E_S$ is a predetermined function of regulated supply voltage used throughout the circuit, and
$E_{TI}$ is a constant voltage which reflects the inertial character of injector means 34.
And it is observed that the above voltage expression for $E_{MOD.}$ assumes fidelity of the multiplication function at 55.

The square-wave pulses produced by generators 46-47 are illustratively presented at upper and lower levels of FIG. 12, to the same scale of crankshaft angle, the latter being designated in terms of radians, at $\pi$ intervals (180°). For one running condition, all pulses may be determined by the respective generators 46-47 to be of width $W_1$, for which the solid-line envelopes apply. For another running condition, as at lesser throttle, the $E_{MOD.}$ voltage will have been generated at reduced amplitude, resulting in shorter pulse lengths $W_2$ in the respective output signals of generators 46-47, and a dashed line for each pulse will be understood to identify the trailing edge of thus-reduced pulses.

The described embodiments of the invention will be seen to have achieved all stated objects. In particular, fast response to throttle position (knob 54) is realized by injection directly into individual crankcase regions of the respective cylinders. By making such injection on the downstream side of the intake check-valve or reed-bank locations, there is assurance against the backfiring, coughing and sputtering often associated with carburetor systems. And better fuel distribution is achieved by injecting transverse to the intake flow and so as to involve the flow contribution of every reed, thus enabling the engine to run leaner (with improved economy) and enabling production of greater power and performance efficiency.

By ganging plural fuel-injections to the same firing pulse, the number of crankcase pressure pulses is materially reduced, and the fuel-supply line 40 can more gracefully, reliably and equitably deliver fuel to the various injector (34) inlets. Stated in other words, the number of differential injection-pressure fluctuations is materially reduced, and any fluctuations do not occur at such time in the injection phase of one group of cylinders as to interfere with or affect precise accomplishment of the injection phase in another group of cylinders. And the foregoing statements apply in spite of the short time lag (approximately one millisecond) involved in inertial characteristics of injector response.

While the invention has been described in detail for the preferred embodiments shown, it will be understood that modifications may be made without departure from the claimed invention. For example, it will be understood that for an embodiment involving other than two injection pulses per crankshaft revolution, as for example in the three-fire/revolution situations of FIGS. 6 and 10, it is merely necessary to provide an additional square-wave pulse generator (similar to 46 or 47), served by the same line 45 which carries the length-modulating voltage $E_{MOD.}$ Such additional square-wave pulse generator and generators 46 and 47 would have their respective firing (starting) inputs served by the ignition pulse for the particular cylinder to designated in FIG. 6 or FIG. 10, as the case may be, and the particular output connections to injector solenoids would be made as indicated in the functional diagrams of FIGS. 6 and 10.

Also, it will be understood that although all fuel-injection control pulses are shown to commence at substantially the instant of the input trigger pulse associated with a spark-plug firing, this need not be the case. In fact, ganged delay means (suggested by a single dashed line traversing the firing inputs to generators 46 and 47) will be understood to indicate that upon manipulation of a single delay-control variable means 58, the arrival time of firing pulses to the respective input connections of generators 46-47 may be selectively delayed, but always to the same extent for both generators, thus producing a selectively variable advance/retard function, as to the time of initiation of the square waves currently generated at 46-47.

Still further, it will be understood that instead of using separate square-wave pulse generators as at 46-47 in FIG. 11, a single pulse generator 46' may be used, in conjunction with suitable switching means 59 as suggested by the diagram of FIG. 11A. Since all square waves are of relatively small duration compared to the crankshaft cycle, even at full engine speed, there need be no ambiguity of commutating pulses to the correct injectors via suitable switching means 59, which in the case of two injection intervals per crankshaft rotation may be merely a bistable flip-flop of suitable capacity. Thus, in FIG. 11A, the firing-pulse line for cylinder #1 may control switch means 59 to channel the square-wave output at 46' to the injectors for cylinders #2, #3 and #4, for the FIG. 5 situation, while the firing-pulse line for cylinder #4 controls switch means 59, to channel the square-wave output at 46' to the injectors for cylinders #5, #6 and #1, it being understood that diode devices may serve to isolate the respective pulse-initiating functions of the firing pulses, as suggested by symbols in the drawing.

What is claimed is:

1. In a two-cycle six-cylinder internal combustion engine, each cylinder having an associated crankcase with a gas-flow inlet including a check valve, and each cylinder having an exhaust outlet exclusive of the associated crankcase region, means operating in timed relation with a piston in each cylinder for admitting to the associated combustion region gas compressed in the associated crankcase region, an electrically operable fuel-injection device associated with each cylinder for injecting fuel into the crankcase region of that cylinder, ignition means associated with each cylinder and successively operative substantially at the top-center condition of the piston in each cylinder, first fuel-injection signal-generator means producing a first control-signal output in response to the ignition function in one of said cylinders, second fuel-injection signal-generator means producing a second control-signal output in response to the ignition function in a second cylinder whose cycle is 180-degrees phase-displaced from said one cylinder, the first control-signal output being connected to the fuel-injection device associated with said second cylinder and with the respective fuel-injection devices of the two cylinders whose cycles are respectively in 60 degrees and 120 degrees phase-lagging relation to said second cylinder, the second control-signal output being connected to the fuel-injection device associated with said one cylinder and with the respective fuel-injection devices of the two remaining cylinders.

2. In a two-cycle internal combustion engine having an even number of cylinders wherein the number is at least four, each cylinder having an associated crankcase with a gas-flow inlet including a check valve, and each cylinder having an exhaust outlet exclusive of the associated crankcase region, means operating in timed relation with a piston in each cylinder for admitting to the associated combustion region gas compressed in the associated crankcase region, an electrically operable fuel-injection device associated with each cylinder for injecting fuel into the crankcase region of that cylinder, ignition means associated with each cylinder and successively operative substantially at the top-center condition of the piston in each cylinder, first fuel-injection signal-generator means producing a first control-signal output in response to the ignition function in one of said cylinders, second fuel-injection signal-generator means producing a second control-signal output in response to the ignition function in a second cylinder whose cycle is 180-degrees phase-displaced from said one cylinder, the first control-signal output being connected to the fuel-injection device associated with said second cylinder and with the fuel-injection devices of such other cylinders whose cycles are in less than 180 degrees phase-lagging relation to said second cylinder, the second control-signal output being connected to the fuel-injection device associated with said one cylinder and with the respective fuel-injection devices of such other cylinders whose cycles are in less than 180 degrees phase-lagging relation to said one cylinder.

3. The two-cycle engine of claim 2, wherein the number of cylinders is four, whereby each control-signal output is simultaneously operative upon the fuel-injection devices of two cylinders.

4. The two-cycle engine of claim 2, wherein the number of cylinders is six, whereby each control-signal output is simultaneously operative upon the fuel-injection devices of three cylinders.

5. The two-cycle engine of claim 2, wherein the number of cylinders is eight, whereby each control-signal output is simultaneously operative upon the fuel-injection of four cylinders.

6. In a two-cycle six-cylinder internal combustion engine, each cylinder having an associated crankcase with a gas-flow inlet including a check valve, and each cylinder having an exhaust outlet exclusive of the associated crankcase region, means operating in timed relation with a piston in each cylinder for admitting to the associated combustion region gas compressed in the associated crankcase region, an electrically operable fuel-injection device associated with each cylinder for injecting fuel into the crankcase region of that cylinder, ignition means associated with each cylinder and successively operative substantially at the top-center condition of the piston in each cylinder, first fuel-injection signal-generator means producing a first control-signal output in response to the ignition function in one of said cylinders, second fuel-injection signal-generator means producing a second control-signal output in response to the ignition function in a second cylinder whose cycle is 120 degrees phase-lead displaced from said one cylinder, third fuel-injection signal-generator means producing a third control-signal output in response to the ignition function in a third cylinder whose cycle is 120-degrees phase-lead displaced from said second cylinder, the first control-signal output being connected to the fuel-injection devices associated with said second cylinder and with the cylinder whose cycle is in 60 degrees phase-leading relation to said second cylinder, the second control-signal output being connected to the fuel-injection devices associated with said third cylinder and with the cylinder whose cycle is in 60 degrees phase-leading relation to said third cylinder, and the third control-signal output being connected to the fuel-injection devices associated with said one cylinder and with the cylinder whose cycle is in 60 degrees phase-leading relation to said one cylinder.

7. In a two-cycle five-cylinder internal combustion engine, each cylinder having an associated crankcase with a gas-flow inlet including a check valve, and each cylinder having an exhaust outlet exclusive of the associated crankcase region, means operating in timed relation with a piston in each cylinder for admitting to the associated combustion region gas compressed in the associated crankcase region, an electrically operable fuel-injection device associated with each cylinder for injecting fuel into the crankcase region of that cylinder, ignition means associated with each cylinder and operative in one-two-three-four-five succession substantially at the top-center condition of the piston in each cylinder, first fuel-injection signal-generator means producing a first control-signal output in response to the ignition function in cylinder-one of said succession, second fuel-injection signal-generator means producing a second control-signal output in response to the ignition function in cylinder-three of said succession, the first control-signal output being connected to the fuel-injection devices associated with said cylinders two and three and four, the second control-signal output being connected to the fuel-injection devices associated with said cylinders five and one.

8. In a two-cycle five-cylinder internal combustion engine, each cylinder having an associated crankcase with a gas-flow inlet including a check valve, and each cylinder having an exhaust outlet exclusive of the associated crankcase region, means operating in timed relation with a piston in each cylinder for admitting to the associated combustion region gas compressed in the associated crankcase region, an electrically operable fuel-injection device associated with each cylinder for injecting fuel into the crankcase region of that cylinder, ignition means associated with each cylinder and operative in one-two-three-four-five succession substantially at the top-center condition of the piston in each cylinder, first fuel-injection signal-generator means producing a first control-signal output in response to the ignition function in cylinder-one of said succession, second fuel-injection signal-generator means producing a second control-signal output in response to the ignition function in cylinder-three of said succession, third fuel-injection signal-generator means producing a third control-signal output in response to the ignition function of cylinder-five of said succession, the first control-signal output being connected to the fuel-injection devices associated with said cylinders three and four, the second control-signal output being connected to the fuel-injection devices associated with said cylinders five and one, and the third control-signal output being connected to the fuel-injection device associated with said cylinder-two.

9. The two-cycle engine of claims 2, 7 or 8, in which a single square-wave generator device is operative in response to an initiating input pulse to generate an output square wave of variable duration which does not exceed 120 degrees of shaft rotation of said engine, the output of said square-wave generator being connected in time-controlling relation with said respective fuel-injection signal-generator means, whereby the currently varied duration of said square-wave output is supplied by the respective signal-generator means to the fuel-injection devices associated therewith.

10. The two-cycle engine of claim 2, wherein the cylinders are arrayed in a V-configuration of two banks of cylinders in planes which are angularly spaced to the extent $2\pi k/n$ radians, where n is the number of cylinders in said engine and k is either 1 or 2.

11. The two-cycle engine of claim 2, in which each signal generator includes its own square-wave pulse generator, and a single variable timing means including throttle-control means connected in pulse-length controlling relation with all pulse generators for determining the same timed duration of fuel injections in all cylinders for a given throttle setting.

12. The two-cycle engine of claim 11, in which said variable timing means includes selectively operable means for varying the advance/retard relation between the instant of an ignition function and the instant of initiating the timed pulse length.

13. The two-cycle engine of claim 2, in which each check valve comprises an elongate bank of reed elements arrayed transverse to the path of inlet-air flow into the crankcase region of the associated cylinder, the associated fuel-injection device comprising a nozzle oriented to discharge along an axis that is (a) transverse to said path and (b) parallel to the array orientation of said reed bank and (c) near the location of reed-bank discharge into the associated crankcase region.

14. The two-cycle engine of claim 13, in which the reed elements of said bank are in paired and opposed adjacency.

15. In a two-cycle internal combustion engine having at least four cylinders, each cylinder having an associated crankcase with a gas-flow inlet including a check valve, and each cylinder having an exhaust outlet exclusive of the associated crankcase region, means operating in timed relation with a piston in each cylinder for admitting to the associated combustion region gas compressed in the associated crankcase region, an electrically operable fuel-injection device associated with each cylinder for injection fuel into the crankcase region of that cylinder, ignition means associated with each cylinder and successively operative substantially at the top-center condition of the piston in each cylinder, fuel-injection signal-generator means producing a first square-wave control-signal output in response to the ignition function in one of said cylinders, said fuel-injection signal-generator means producing a second square-wave control-signal output in response to the ignition function in a second cylinder whose cycle is in the range of 120-degrees to 180-degrees phase-displaced from said one cylinder, the first control-signal output being connected to the fuel-injection devices of at least a first two cylinders other than said one cylinder, the second control-signal output being connected to the fuel-injection devices of at least a second two cylinders other than said second cylinder and other than said first two cylinders, and selectively variable control means connected to said signal-generator means for coordinating the generation of square-wave signals of like but selectively variable duration in both said control-signal outputs.

16. The engine of claim 15, in which said fuel-injection signal-generator means comprises a single square-wave pulse generator having a single output circuit which includes a commutating switch having two outputs, one of said switch outputs being connected to the fuel-injection devices of said first two cylinders and the other of said switch outputs being connected to the fuel-injection devices of said second two cylinders, said commutating switch having switch-actuating input-connection means responsive to the respective ignition functions in said first and second cylinders.

17. The engine of claim 15, in which said fuel-injection signal-generator means comprises like first and second square-wave pulse generators which respectively provide said first and said second control-signal outputs, each of said pulse generators having its own pulse-initiating input connection for response to a different one of the respective ignition functions in said first and second cylinders.

18. The engine of claim 15, in which said selectively variable control means comprises voltage-varying means having a source-voltage input and a selectively variable ouput, a voltage source connected to said input, aid voltage source having separate input connections for independent response to sensed inlet-air absolute pressure and sensed inlet-air absolute temperature and producing a voltage output which is continuously indicative of the instantaneous sensing of inlet-air density, whereby the output of said voltage-varying means is a selected fraction of the voltage indicative of inlet-air density, and means including a tachometer generator connected to the output of said voltage-varying means for modififying said output in accordance with tachometer-generator output so as to additionally reflect correction for instantaneous engine speed.

19. The engine of claim 15, in which said selectively variable control means comprises a voltage-generating network which generates a pulse-width modulating voltage $$E_{MOD.} = k \cdot E_{MF}/(E_S - E_E) + E_{TI},$$

where $E_{MF}$ is a voltage which is indicative of sensed inlet-air density, k is a selectively variable fraction representing throttle selection, $E_S$ is a predetermined function of regulated supply voltage, $E_E$ is a voltage indicative of engine speed, corrected for volumetric efficiency of the engine, and $E_{TI}$ is a constant voltage which reflects the inertial character of said fuel-injector means.

* * * * *